United States Patent
Gupta et al.

(10) Patent No.: US 8,774,184 B2
(45) Date of Patent: Jul. 8, 2014

(54) MEMORY AND PROCESSOR EFFICIENT NETWORK COMMUNICATIONS PROTOCOL

(75) Inventors: Sunil Gupta, Weston, FL (US); Tanner R. Andrews, Deland, FL (US); David M. Cole, Pembroke Pines, FL (US); Sekar Udayamurthy, Plano, TX (US); Corey Brady, Charlottesville, VA (US); Patrick M. Milheron, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 283 days.

(21) Appl. No.: 12/578,333

(22) Filed: Oct. 13, 2009

(65) Prior Publication Data

US 2010/0027565 A1   Feb. 4, 2010

Related U.S. Application Data

(62) Division of application No. 10/984,139, filed on Nov. 9, 2004, now abandoned.

(51) Int. Cl.
*H04L 12/28*   (2006.01)

(52) U.S. Cl.
USPC ............ 370/392; 370/394; 709/227; 709/230

(58) Field of Classification Search
None
See application file for complete search history.

(56) References Cited

U.S. PATENT DOCUMENTS

| | | | | |
|---|---|---|---|---|
| 5,325,361 A | * | 6/1994 | Lederer et al. | 370/401 |
| 5,651,136 A | * | 7/1997 | Denton et al. | 711/118 |
| 5,937,169 A | * | 8/1999 | Connery et al. | 709/250 |
| 5,970,063 A | | 10/1999 | Chapman et al. | |
| 5,999,541 A | * | 12/1999 | Hinchey et al. | 370/466 |
| 6,704,786 B1 | | 3/2004 | Gupta et al. | |
| 6,775,305 B1 | | 8/2004 | Delvaux | |
| 6,856,975 B1 | | 2/2005 | Inglis | |
| 6,858,975 B1 | | 2/2005 | Matsutani | |
| 7,281,187 B2 | * | 10/2007 | Yonge et al. | 714/752 |
| 2003/0137939 A1 | | 7/2003 | Dunning et al. | |
| 2005/0071511 A1 | | 3/2005 | Chen | |
| 2006/0039698 A1 | * | 2/2006 | Pautler et al. | 398/33 |

OTHER PUBLICATIONS

Vinton G. Cerf and Robert E. Kanh, A Protocol for Packet Network Intercommunication. IEEE Transactions on Communications, vol. Com-22, No. 5, May 1974.

* cited by examiner

*Primary Examiner* — Brian Roberts
(74) *Attorney, Agent, or Firm* — Michael A. Davis, Jr.; Frederick J. Telecky, Jr.

(57) ABSTRACT

System and method for a full featured network communications protocol that is both memory and processor efficient. A preferred embodiment comprises a method for transmitting information between electronic devices, the method comprising creating a connection between a pair of electronic devices, sending a packet between the pair, acknowledging a receipt of the packet by a receiver of the packet, and dissolving the connection when it is no longer needed. The creating of the connection comprises assigning a port number to the connection at an initiating electronic device and then transmitting a connection request containing the port number to a servicing electronic device. After the transmitting, the creating further comprises receiving a second port number to the connection from the servicing electronic device.

12 Claims, 6 Drawing Sheets

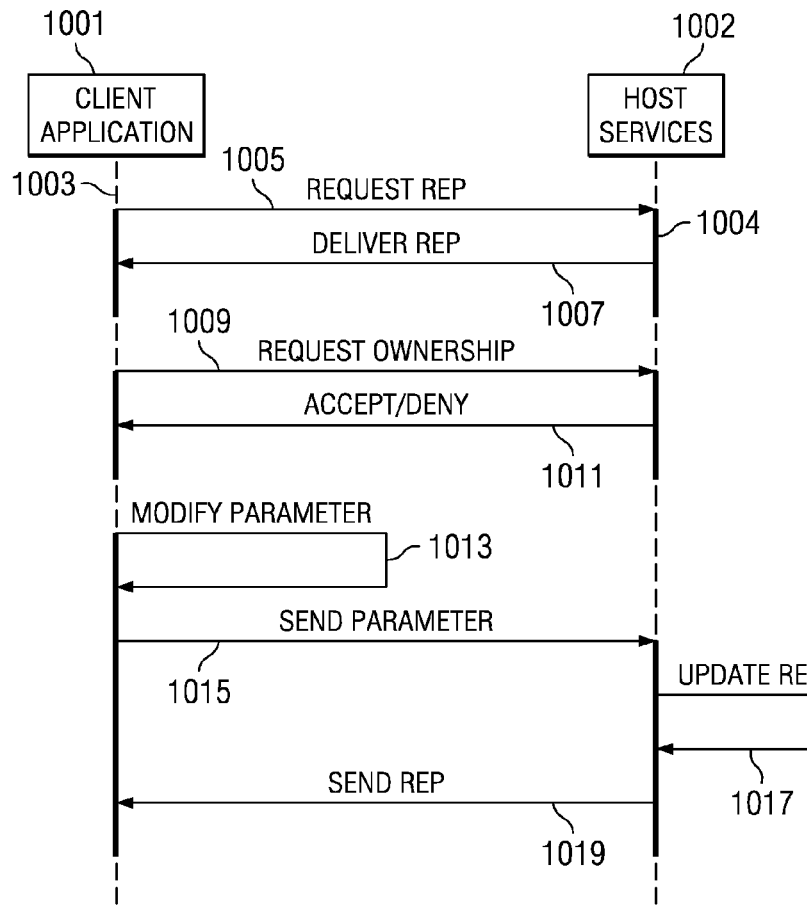
*FIG. 10a*
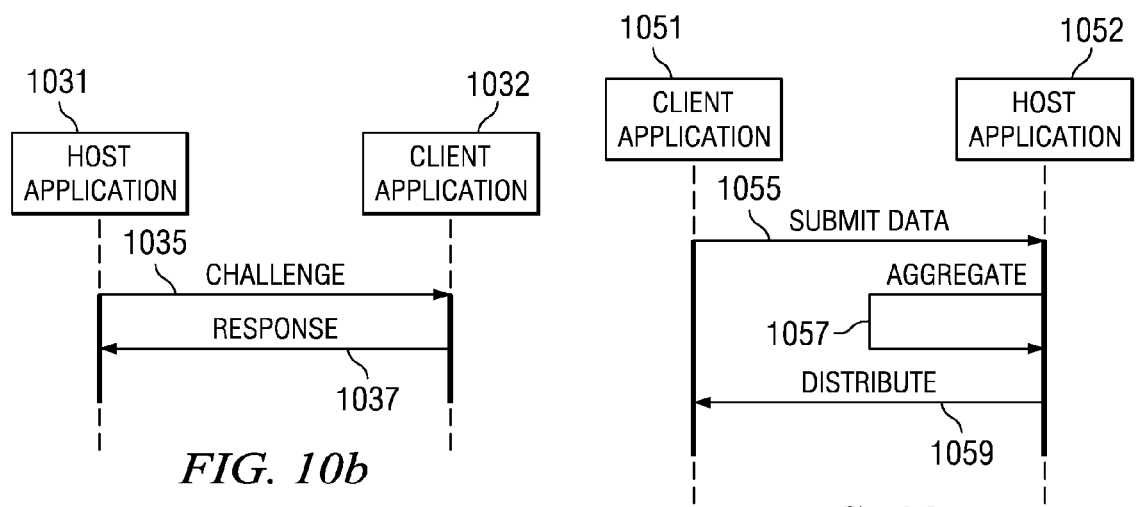
*FIG. 10b*
*FIG. 10c*

MEMORY AND PROCESSOR EFFICIENT NETWORK COMMUNICATIONS PROTOCOL

CROSS-REFERENCE TO RELATED APPLICATIONS

This application is a divisional of U.S. application Ser. No. 10/984,139, filed Nov. 9, 2004, which is herein incorporated by reference.

TECHNICAL FIELD

The present invention relates generally to a system and method for digital communications, and more particularly to a system and method for a full featured network communications protocol that is both memory and processor efficient.

BACKGROUND

There are a large number of network communications protocols that can be used to provide a way for electronic devices, such as computers, personal digital assistants, electronic calculators, telemetry devices, and so forth, to exchange information and data. The capabilities of the available network communications protocols can vary widely, ranging from simple and small to large and complex.

The simple and small network communications protocols typically trade-off a rich feature set and fault tolerance for the ability to operate on electronic devices with limited processing capability and memory capacity. Furthermore, the simple and small network communications protocols usually offer good performance due to smaller overhead. The large and complex network communications protocols usually require electronic devices with some minimum level of processing capacity and memory. However, in return, the large and complex network communications protocols will usually provide a wide variety of message routing options and the ability to tolerate certain types of faults.

While the large and complex network communications protocols offer a rich feature set, along with fault tolerance, their computation and memory requirements may preclude their use in applications wherein the electronic devices do not meet the requirements. However, there are situations wherein these electronic devices require the ability to route messages in several different ways as well as the ability to tolerate certain types of faults.

One approach that can be used to meet the communications requirement of the electronic devices would be to add additional capability to an existing network communications protocol, wherein the existing network communications protocol provided some but not all of the needed functionality and had computation and memory requirements that could be met by the electronic devices. This approach can have the advantage of making use of an existing and well-tested network communications protocol that may have a large set of development tools.

One disadvantage of the prior art is even if the existing network communications protocol has computation and memory requirements that can be met by the electronic devices, there may not be any assurance that the electronic devices will be able to meet the computation and memory requirements of the modified network communications protocol.

A second disadvantage of the prior art is that if too many modifications are made to the existing network communications protocol, the amount of development may be similar to the development required to create a network communications protocol from scratch and will not adhere to the standards set by the protocol. Hence tools that are built for that protocol may no longer work.

SUMMARY OF THE INVENTION

These and other problems are generally solved or circumvented, and technical advantages are generally achieved, by preferred embodiments of the present invention which provides for a memory and processor efficient network communications protocol.

In accordance with a preferred embodiment of the present invention, a method for communicating between electronic devices in a communications network is provided. The method comprises creating a connection between a first electronic device and a second electronic device, wherein the creating comprises, assigning a first port number to the connection at the first electronic device, transmitting a connection request to the second electronic device, and receiving a second port number to the connection from the second electronic device. The method further comprises sending a packet between the first electronic device and the second electronic device, wherein the packet contains at least a portion of the communications being transmitted, wherein the packet can originate at either the first electronic device or the second electronic device, acknowledging a receipt of the packet by a receiver of the packet, and dissolving the connection.

In accordance with another preferred embodiment of the present invention, a header for a transmission packet is provided. The header comprises an identifier field comprising data to distinguish traffic type, a source address field following the identifier field, the source address field comprising an address of a source device and a source port of the header, a destination address field following the source address field, the destination address field comprising an address of a destination device and a destination port of the header, a payload error check code field following the destination address field, the payload error check code field comprising an error check for a data payload contained in the transmission packet, a payload size field following the payload error check code field, the payload size field comprising a size indicator of the data payload, a hop count field following the payload size field, the hop count field comprising a count of a maximum number of routes the transmission packet can traverse, a sequencing field following the hop count field, the sequencing field comprising a value used to order the transmission packet and a header error check code field following the sequencing field, the header error check code field comprising an error check for the header.

An advantage of a preferred embodiment of the present invention is that it has been designed to provide a wide range of routing functionality with a degree of fault tolerance with small processor and memory requirements.

A further advantage of a preferred embodiment of the present invention is that since it has been designed with specific requirements in mind, it has minimal overhead, just sufficient to meet the requirements.

Yet another advantage of a preferred embodiment of the present invention is that with small processor and memory requirements, the present invention can be used in a wide range of applications with a variety of electronic devices.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 10a through 10c are diagrams of packet interchanges between devices on a network, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a point-to-point network comprising a host and a plurality of client devices, wherein the client devices may have limited computational capability and memory. The invention may also be applied, however, to other networks, including broadcast and shared medium, wherein a processor and memory efficient network communications protocol that is capable of a degree of fault tolerance is desired.

Figure 1A:
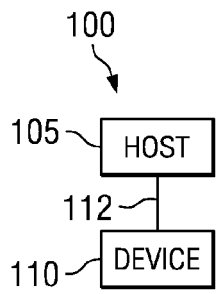
FIGS. 1a through 1c are diagrams of several computational network configurations of a point-to-point network.
Figure 1B:
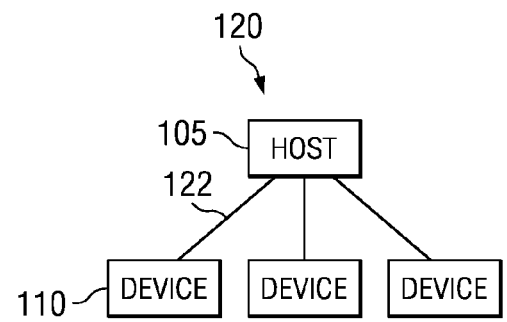
Figure 1C:
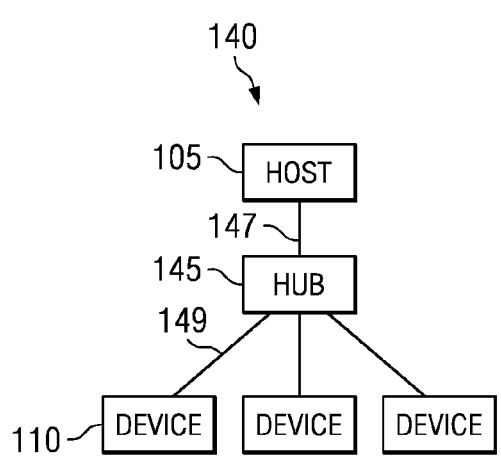

With reference now to FIGS. 1a through 1c, there are shown diagrams illustrating several different computational network configurations of a point-to-point network. FIG. 1a illustrates a computational network 100 wherein a host device 105 is connected to an electronic device 110 via a network connection 112. Being a point-to-point network, the network connection 112 connects a pair of devices (in this case, the host device 105 and the electronic device 110).

Note the term computational network is used herein to describe a plurality of electronic devices (the host device 105 and the electronic device 110) that are connected to each other via a network (the network connection 112). While the term communications network is typically used to describe the collection of communications devices and transmission medium upon which data and information is transferred between the plurality of electronic devices, the use of the term computational network should not be construed as limiting the electronic devices to being computers. In fact, examples of electronic devices that can be used in a computational network may include, but are not limited to: computers and peripherals, personal digital assistants, calculators, data storage devices, multimedia sources (such as video cameras and multimedia-on-demand services), multimedia sinks (such as video and audio display devices), telemetry equipment, environmental sensors, and so forth.

A point-to-point network can also be used to permit the connection of multiple devices to a single device. FIG. 1b illustrates a computational network 120 wherein a point-to-point network connects the host device 105 to a plurality of electronic devices (such as the electronic device 110). Since the network is a point-to-point network, a network connection 122 between the host device 105 and the electronic device 110 couples only those two devices and additional network connections are needed to connect the host device 105 to the remaining electronic devices.

FIG. 1c illustrates a computational network 140 wherein a hub 145 is used to connect the host device 105 to a plurality of electronic devices (such as the electronic device 110). The hub 145 permits the sharing of a single network connection 147 between the plurality of electronic devices. The hub 145 is then connected to the electronic devices (such as the electronic device 110) via a network connection 149. The use of the hub 145 can permit the host device 105 connect to a plurality of electronic devices without having to have multiple network connections. For example, if the host device 105 has only one network connection, without the use of the hub 145, the host device 105 may only be able to connect to a single electronic device. However, through the use of the hub 145, the host device 105 can connect to multiple electronic devices.

Figure 2:
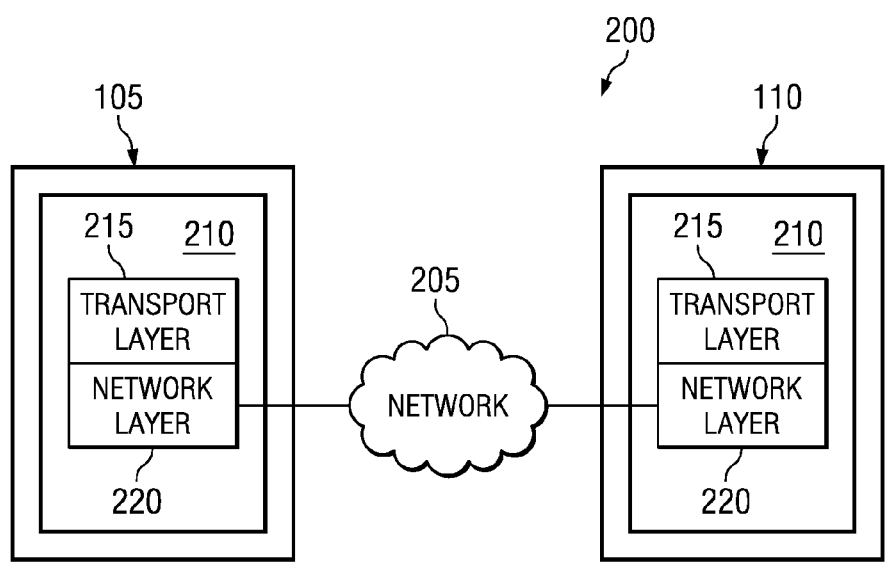
FIG. 2 is a diagram of detailed view of a computational network containing a host device and an electronic device.

With reference now to FIG. 2, there is shown a diagram illustrating a computational network 200 containing the host device 105 and the electronic device 110, wherein a detailed view is provided of the host device 105 and the electronic device 110. The host device 105 and the electronic device 110 can couple to a network 205 via a network interface 210. The network interface 210 can be logically partitioned into a series of layers, with a seven-layer OSI (Open Systems Interconnection) model being a commonly used representation. The network interface 210, shown in FIG. 2, is partitioned into two layers, a transport layer 215 and a network layer 220, with the remaining five layers of the seven-layer OSI model not being shown. The transport layer 215 accepts information from higher level layers and performs any necessary coding and partitioning of the information in preparation for transmission. The network layer 220 can be used to control the operation of the network 205 and how the information (typically in the form of packets) is moved through the network 205.

Depending upon the functionality of the electronic devices coupled to a computational network and set of desired properties for the computational network, it can be possible to determine a suitable network communications protocol, e.g., specify the network layer 220. For the present invention, the network communications protocol should have the following properties: 1) devices can discover (be assigned) protocol addresses, 2) devices need protocol addresses, 3) devices resolve protocol addresses to reach peers, 4) broadcast capable, 5) affirmative congestion control, 6) connection (stream) oriented, 7) connectionless (datagram) oriented, 8) end-to-end delivery, not just single-segment, 9) can return errors to sender, e.g. oversize packet, 10) forward error correcting, 11) can fragment and re-assemble packets, 12) easy layered implementation, 13) independent of specific hardware, 14) protocol is light-weight (low number of overhead bytes), 15) header satisfies some condition, so it is easy to recognize packets, 16) multicast capable, 17) can re-order out-of-order packets, 18) capable of operating over peer-to-peer link, 19) quality of service may be specified or adjusted, 20) re-transmit, 21) can be forwarded by routers, 22) packet sequence numbering, 23) handles multiple apps simultaneously, 24) handles shared media, 25) limits on payload sizes, 26) can subnet, 27) unicast, and 28) outstanding packets permitted.

With the specification of the desired properties of the network communications protocol, it may be possible to determine if an existing network communications protocol possesses the specified properties. For example, one existing network communications protocol commonly referred to as "NULL," which performs as a pass-through from layer five to layer two of the seven-layer OSI model, supports only some of the desired properties, such as properties: 7) connectionless (datagram) oriented, 8) end-to-end delivery, not just single-segment, 12) easy layered implementation, and so forth. Clearly, the NULL protocol is not a suitable candidate. Another existing network communications protocol commonly referred to as "IPv4 (Internet Protocol version 4)," supports a majority of the desired properties, with notable exceptions including property 14) protocol is light-weight (low number of overhead bytes). However, to provide substantially complete support for the desired properties, additional protocols may need to be layered over IPv4. For example, to ensure reliable packet delivery, transmission control protocol (TCP) needs to be layered over IPv4, while the user datagram protocol (UDP) is needed to provide "best effort" datagram transmission. The addition of these protocols (and others) can significantly increase the memory footprint (the amount of memory required to execute the network communications protocol), the processing requirements (the computational power required to support the network communications protocol), and the overall overhead of the network communications protocol. These factors can help to preclude the use of IPv4 (and other network communications protocols) in electronic devices with limited capability or resources.

Since an existing network communications protocol that efficiently meets the desired properties without requiring electronic devices with a significant memory footprint and processing power is not readily available, a custom designed network communications protocol is needed. The use of a custom design techniques permit the creation of a network communications protocol that is exactly tailored to meet the desired properties without the presence of unwanted properties (features), the presence of which can lead to an inefficient protocol. Furthermore, a custom designed network communications protocol may not require the addition of extra protocols that would unnecessarily increase memory footprint and processor power requirements. Additionally, the addition of extra protocols increases the overall network communications protocol overhead, resulting in a decrease in performance.

A description of a network communications protocol can be achieved by a discussion of its behavior (in terms of establishing communications between electronic devices, management of packets, response to errors, and so forth) and the structure of its header. A detailed discussion of the behavior of a preferred embodiment of the present invention and the header used is presented below.

Figure 3A:
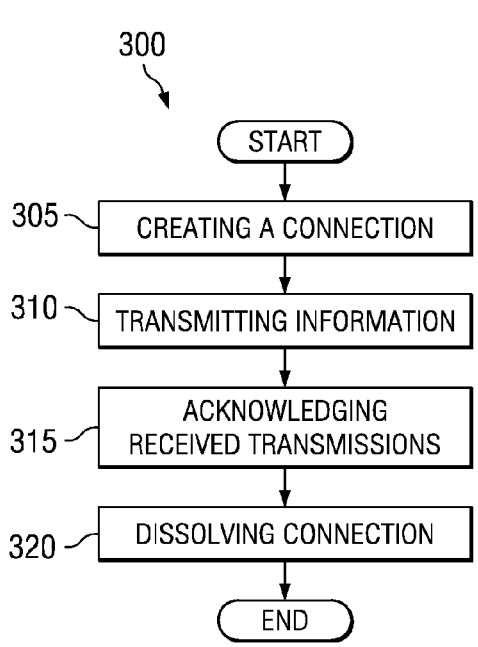
FIGS. 3a and 3b are diagrams of sequences of events in transmitting information and creating a connection between electronic devices, according to a preferred embodiment of the present invention.

With reference now to FIG. 3a, there is shown a diagram illustrating a sequence of events 300 in transmitting information between electronic devices, according to a preferred embodiment of the present invention. To transmit information between electronic devices, be it using a point-to-point connection, a shared medium connection, or so forth, a sequence of operations may need to be performed. Prior to transmitting information, a connection between the transmitting electronic devices needs to be created (block 305). A detailed discussion of the creation of a connection between a pair of electronic devices is provided below. After the connection between the electronic devices is made, then the information can be transmitted between the electronic devices (block 310). The way in which the information is transmitted can be dependent upon the nature of the connection, for example, if the connection is a full-duplex connection, then the electronic devices can exchange information simultaneously, while if the connection is a half-duplex connection, then the electronic devices may have to wait for access to the connection.

In order to provide a measure of robustness to the communications, acknowledgments can be transmitted back to an originator of a transmission once the transmission has been received (block 315). An acknowledgement can be used to indicate that the transmission was successfully received or that it was unsuccessfully received. A detailed discussion concerning the generation and processing of acknowledgments is provided below. Once the electronic devices have completed their transmissions, the connection may be dissolved (block 320). The elimination of a connection after it is no longer needed can be helpful in the reuse of important resources that may be in short supply.

Figure 3B:
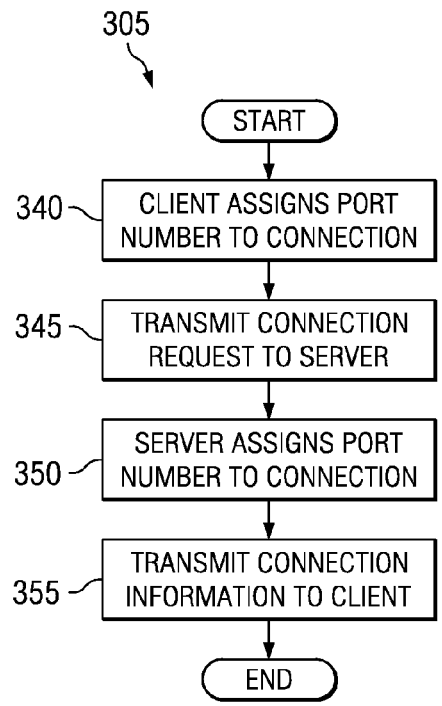

With reference now to FIG. 3b, there is shown a diagram illustrating a sequence of events 305 in creating a connection between two electronic devices, according to a preferred embodiment of the present invention. The sequence of events can be descriptive of operations taking place in the creating of a connection block (block 305) discussed in FIG. 3a. A connection can be a virtual communications link between a pair of electronic devices over a physical link that can be used to carry packets (data, control, and combinations thereof) between the pair of electronic devices. A connection can be uniquely defined by address and port number of the pair of electronic devices. Note that the sole use of the addresses of the pair of electronic devices is not sufficient to define a connection since it is possible to support multiple applications (each with its own connections) on a single physical link.

The creation of a connection can be initiated when an electronic device that wants to create the connection (referred to as a client) assigns a port number to the connection (block 340). After the client assigns a port number to the connection, the client can transmit a connection request message to an electronic device to which it wants to communicate (referred to as a server) (block 345). According to a preferred embodiment of the present invention, the connection request message can contain information such as the address of the client, the port number assigned to the connection, and the address of the server. When the server receives the connection request message, the server can assign a port to the connection (block 350) and then returns information regarding the connection to the client (block 355). The information returned to the client can include the number of the port assigned to the connection by the server. Note that in order for the server to accept connections to a port, the server must already be listening for transmissions addressed to the port.

The use of client and server port numbers as well as addresses can enable a wide variety of connections. For example, it can be possible for a single server to maintain multiple connections to many clients on a single port. Also it can be possible for client to maintain multiple connections to a single port on a single server as well as connections to a single port number of multiple servers.

Figure 4:
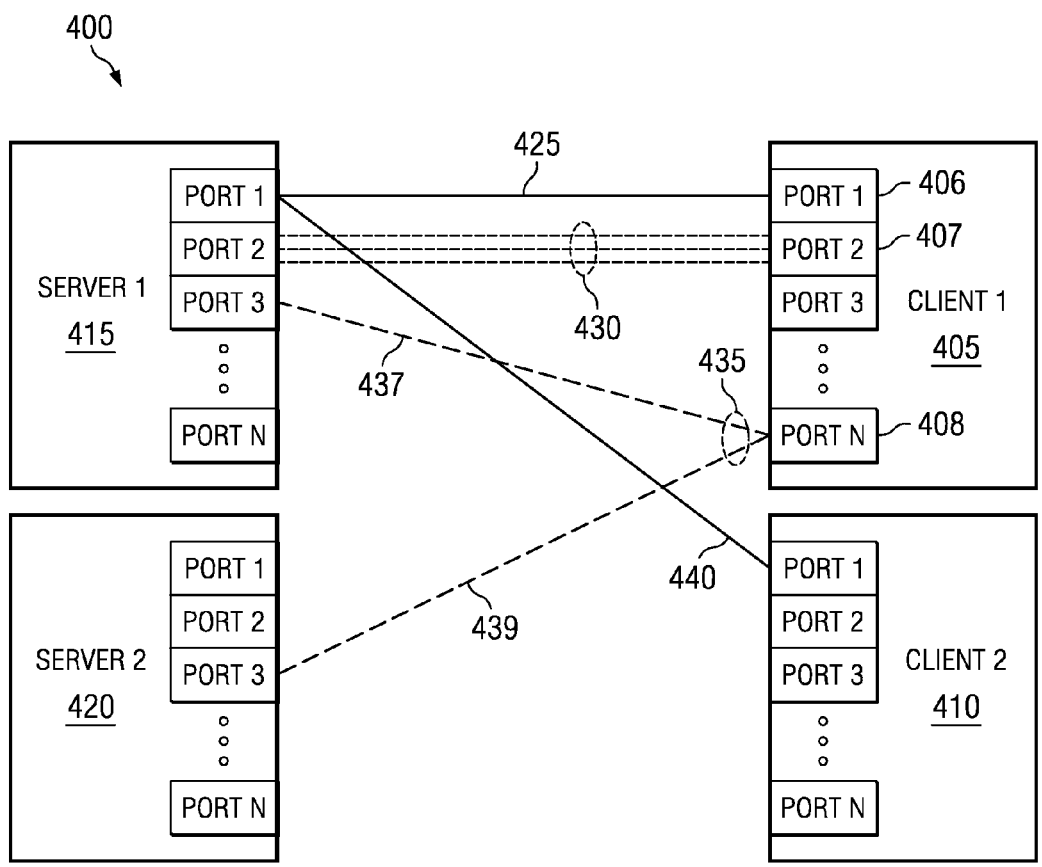
FIG. 4 is a diagram of a computational network with a plurality of exemplary connections, according to a preferred embodiment of the present invention.

With reference now to FIG. 4, there is shown a diagram illustrating a computational network 400 with a plurality of exemplary connections, according to a preferred embodiment of the present invention. The computational network 400, as shown in FIG. 4, includes four electronic devices: a first client "Client 1" 405, a second client "Client 2" 410, a first server "Server 1" 415, and a second server "Server 2" 420. As discussed previously, each of the electronic devices (such as the first client 405) may have a plurality of ports (the first client 405 is shown to have N ports: port 1 406, port 2 407, and port N 408). Note that while each electronic device is shown in FIG. 4 as having N ports, the number of ports available on an electronic device can vary for different devices.

FIG. 4 displays a plurality of exemplary connections that can be supported by a preferred embodiment of the present invention. A first connection 425 is a connection from port 1 406 of the first client 405 to port 1 of the first server 415. A second connection 430 is a plurality of connections from port 2 407 of the first client 405 to port 2 of the first server 415. One possible use of the second connection 430 can be a situation wherein multiple applications are executing on the first client 405 and each of the applications has a need to communicate with the first server 415. Note that it may not be necessary for the connections from the various applications executing on the first client 405 to use the same port nor is it necessary for the connections from the various applications to communicate via the same port on the first server 415.

A third connection 435 is comprised of two connections, a connection 437 from port N 408 of the first client 405 to port 3 of the first server 415 and a connection 439 from port N 408 of the first client 405 to port 3 of the second server 420. An example of a possible use of such a connection could be a situation wherein an application executing on the first client 405 can be serving streaming video and/or audio to the first server 415 and the second server 420. A fourth connection 440 is a connection from port 1 of the second client 410 to port 1 of the first server 415. In combination with the first connection 425, the connections illustrate multiple connections from different client devices (with the same port number) to a single port on a server. Such a connection can be used by a server to serve information to the different client devices.

Figure 5:
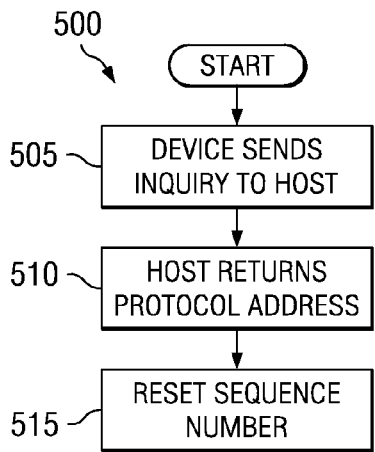
FIG. 5 is a diagram of a start-up sequence of events when an electronic device initially connects to a network, according to a preferred embodiment of the present invention.

With reference now to FIG. 5, there is shown a flow diagram illustrating a start-up sequence of events 500 occurring when an electronic device is initially connected to a network, according to a preferred embodiment of the present invention. When a device is initially connected to a network, the device is expected to send a packet to a host service (executing on a host device) seeking a protocol address (block 505). The host service can then respond to the packet, providing the device with its protocol address (block 510). After the device receives its protocol address from the host service, the device can reset its sequence number (used to enable packet reordering) prior to transmitting any additional packets (block 515). The sequence number is preferably reset to a value of one.

According to a preferred embodiment of the present invention, in-order packet delivery is supported. If packets are received out-of-order, then a mechanism is provided to detect the out-of-order receipt of the packets and to reorder the packets. One method that can be used to support in-order packet delivery and packet reordering is the use of packet numbering. Individually numbering packets can permit the detection of an out-of-order packet as well as the reordering of received packets. It can be possible to number packets based upon individual pairs of applications sharing packets. However, since multiple applications on a pair of devices can have individual connections, the use of packet numbering for individual pairs of applications can consume a considerable amount of memory.

Figure 6A:
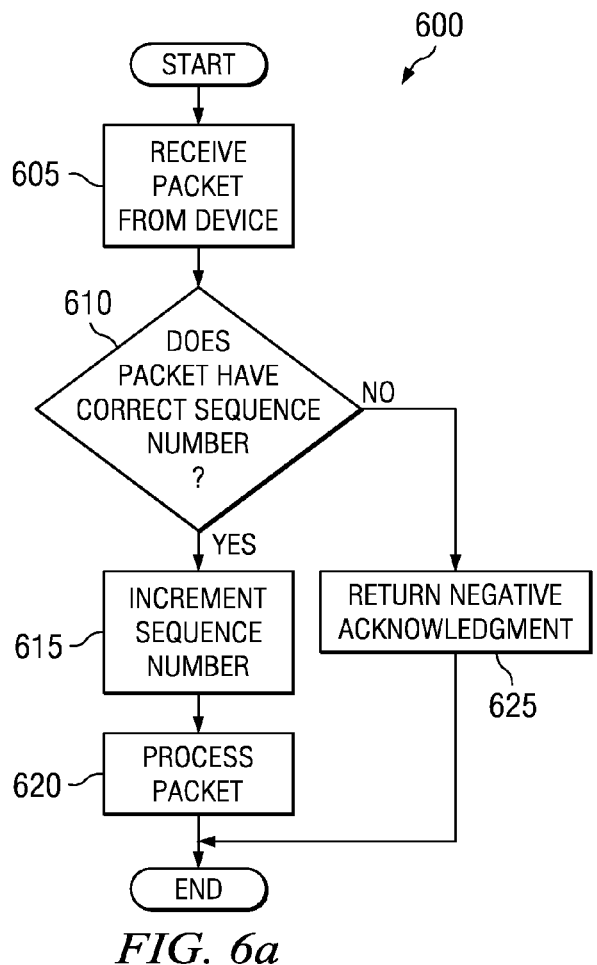
FIGS. 6a and 6b are diagrams of sequences of events for detecting and handling out-of-order packets, according to a preferred embodiment of the present invention.
Figure 6B:
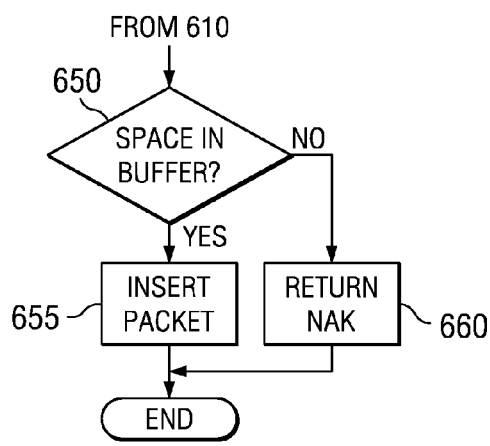

With reference now to FIGS. 6a and 6b, there is shown a diagram illustrating a sequence of events 600 for detecting an out-of-order packet and an alternate way to handle out-of-order packets, according to a preferred embodiment of the present invention. Instead of maintaining packet numbers based on individual pairs of applications, packet numbering can be performed on pairs of communicating devices. The packet numbers can be referred to as sequence numbers or sequencing numbers. Since a pair of communicating devices can have multiple pairs of communicating applications, a reduction in memory usage needed to maintain packet numbers can be achieved. The sequence of events 600 can be used to process received packets and to notify a sender of the receipt of an out-of-order packet.

The sequence of events 600 can begin with a receiver device receiving a packet from a sender device (block 605). Note that since both ends of a communicating devices pair can send packets as well as receive packets, each device should have the ability to process received packets and to determine if an out-of-order packet has been received. After receiving the packet, the receiver device can check to determine if the packet has a correct sequence number (block 610). This can be performed simply by comparing the sequence number of the packet with a sequence number stored in memory that corresponds to a sequence number of a last packet received from the sender device. If the packet has the correct sequence number, then the sequence number stored in memory can be incremented (block 615), the contents of the packet can be processed (block 620), and the sequence of events 600 can end.

If however, the sequence number of the packet is not correct, then the receiver device can return a negative acknowledgment packet (NAK) to the sender device to inform the sender device of the out-of-order packet (block 625) and the sequence of events 600 can terminate. A more elaborate packet processing system is shown in FIG. 6b and can be implemented to improve packet reception performance, albeit at the expense of additional memory, through the use of a buffer to store the packet with the incorrect sequence number. After determining that the sequence number of the packet is not correct (block 610 (FIG. 6a)), the receiver device can check to see if there is sufficient space in a buffer to store the out-of-order packet (block 650). If there is sufficient space, then the receiver device can insert the packet in the buffer (block 655). If there is insufficient space, then the receiver device can return a NAK to the sender device (block 660).

By buffering the packet, the receiver device can wait for additional packet(s) to arrive and if the additional packet(s) has the correct sequencing number, then the packets can be reordered at the receiver. In this case, the sender device does not need to be informed of the out-of-order packet. For example, if the correct sequence number is six (6) but the packet received has a sequence number of seven (7), the packet can be buffered. Additional packets can be buffered and until the buffer fills, the receiver device can continue to receive packets. If a packet with sequence number six (6) is received prior to the buffer overflowing, then the received packets can be processed (as long as the sequence numbers of the received packets continue to be correct). For example, if after the packet with the sequence number seven (7) was received, packets with sequence numbers eight (8), nine (9), ten (10), and six (6) was received, then the entire buffer (containing packets with sequence numbers six, seven, eight, nine, and ten) can be cleared since the buffered packets can be reordered into a properly ordered sequence of packets.

When a packet is received (or not received) and if the packet is received in proper condition or if the packet contains an error, a receiver of the packet can transmit back to a sender if the packet an acknowledgment (ACK) or a negative acknowledgment (NAK) packet. An ACK packet can be used to indicate the receipt of a packet that does not contain errors while a NAK packet can be used to indicate the receipt of a packet that has errors or the non-receipt of a packet.

Figure 7A:
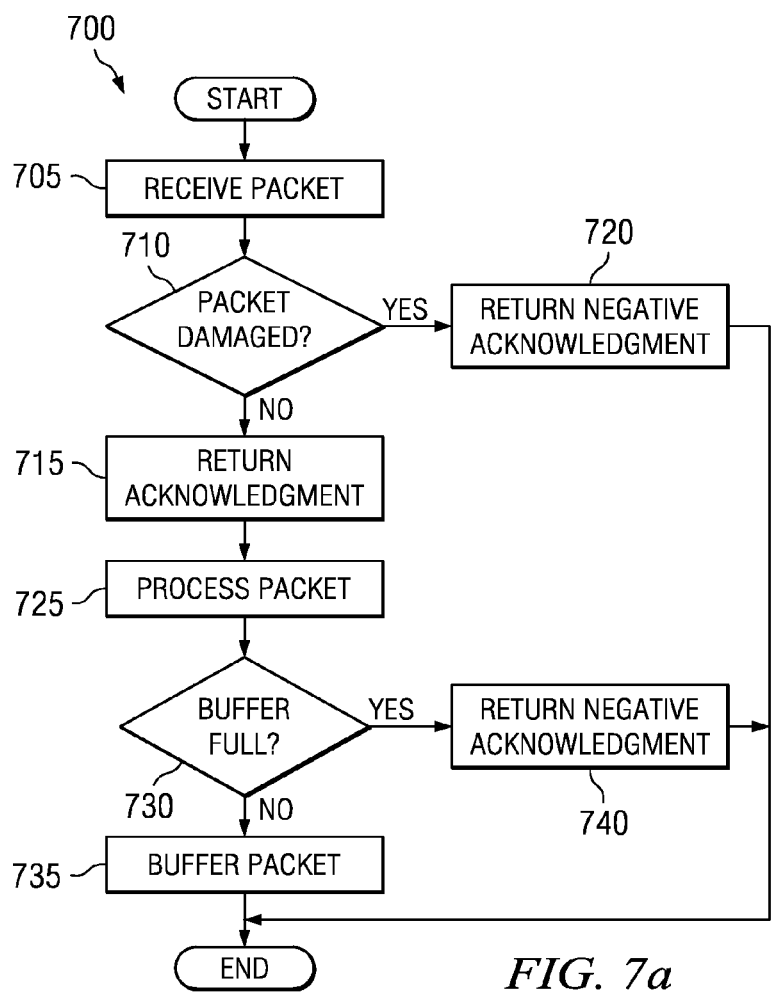
FIGS. 7a and 7b are diagrams of sequences of events for generating and processing ACK and NAK packets, according to a preferred embodiment of the present invention.
Figure 7B:
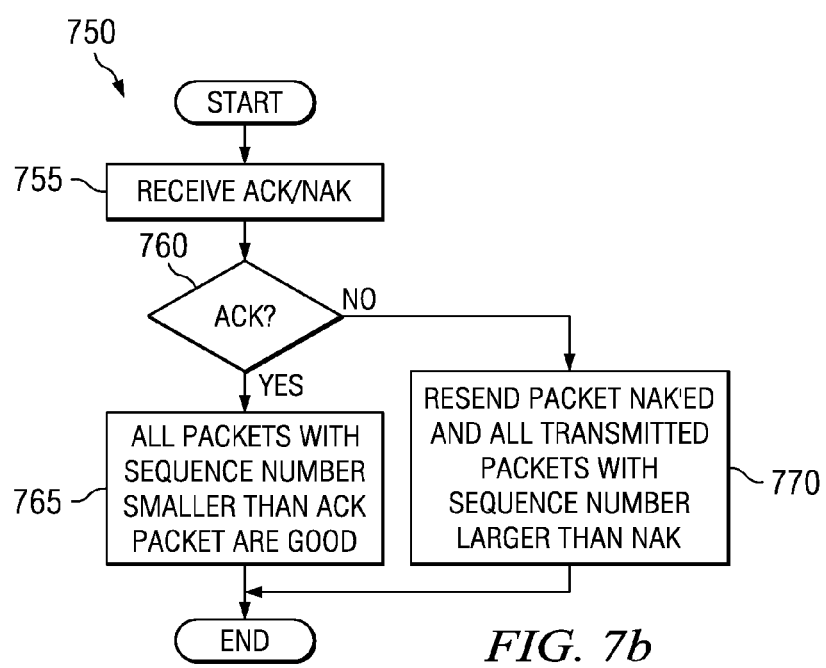

With reference now to FIGS. 7a and 7b, there are shown flow diagrams illustrating algorithms for the generation of ACK and NAK packets at a receiver (algorithm 700 (FIG. 7a)) and processing of ACK and NAK packets at a transmitter (algorithm 750 (FIG. 7b)), according to a preferred embodiment of the present invention.

The diagram shown in FIG. 7a illustrates an algorithm 700 that can be used to generate ACK and NAK packets for packets received at a receiver. After a packet is received at the receiver (block 705), then the receiver can check to determine if the packet has been damaged (block 710). If the packet has not been damaged, the receiver can return an ACK packet to the transmitter of the packet (block 715). However, if the packet has been damaged, the receiver can return a NAK packet to the transmitter of the packet (block 720).

If the packet has not been damaged and the ACK packet has been returned (block 715), then the packet can then be processed by the receiver (block 725). Examples of processing can be determining if the packet is a control packet (such as an ACK or NAK packet), determining the sequencing number of the packet, determining if the packet is in order, and so forth. If the packet is not a control packet and if it is not in order, e.g., the sequencing number of the packet is different from the sequencing number associated with the transmitter-receiver pair, then the packet can be buffered for subsequent reordering. Before the packet can be buffered, a check must be made to determine if there is space in the buffer (block 730). If the buffer is not full, then the packet can be buffered (block 735) and the algorithm 700 can terminate until another packet is received. If the buffer is full, then the packet cannot be buffered. The receiver can return a NAK to indicate that a packet with a correct sequencing number has not been received (block 740). Additionally, the receiver can flush the buffer of any packets associated with the same transmitter-receiver pair with sequence numbers higher than the correct sequencing number. After returning the NAK packet, the algorithm 700 can terminate until another packet is received. As an alternative to waiting for a buffer overflow, a NAK packet can be generated if the receiver has spent a specified amount of time waiting for the arrival of a packet from the transmitter with a specific sequencing number. In yet another alternative, a NAK packet can be generated if either the buffer overflows or the specified amount of time has elapsed.

The diagram shown in FIG. 7b illustrates an algorithm 750 that can be used to process ACK and NAK packets at a transmitter. According to a preferred embodiment of the present invention, after a packet is received by the transmitter and after it has been checked for errors, the packet can be processed to determine if it is a control packet (for example, an ACK or NAK packet). If the transmitter has received either an ACK or a NAK packet (block 755), then the transmitter can begin processing the ACK/NAK packet.

The transmitter can begin processing by determining if the packet is an ACK packet (block 760), if the packet is an ACK packet, then a sequencing number can be retrieved from the ACK packet and the ACK can be an acknowledgment of a successful receipt of a packet with the same sequencing number as well as any packets with smaller sequencing numbers with outstanding ACK packets (block 765). For example, if the transmitter has transmitted packets with sequencing numbers four (4), five (5), six (6), and seven (7) and it receives an ACK packet with sequencing number six (6), then the ACK packet with the sequencing number six (6) will not only function as an ACK packet for the packet with the sequencing number six (6) but it will also function as an ACK packet for packets with the sequencing numbers four (4) and five (5). Note that the packet with the sequencing number seven (7) will have to wait for its own ACK packet (or an ACK packet for a packet with a greater sequencing number).

If the packet is a NAK packet (block 760), then the sequencing number retrieved from the NAK packet can inform the transmitter that a packet with the same sequencing number either arrived at the receiver in a damaged condition or did not arrive at the transmitter at all. Therefore, the transmitter will need to retransmit the packet with the same sequencing number as the NAK packet (block 770). Furthermore, if the transmitter has transmitted packets with sequencing numbers that are greater than the sequencing number of the NAK packet, then the transmitter may have to retransmit those packets as well. After the transmitter has retransmitted the packet(s) or scheduled to retransmit the packet(s), then the algorithm 750 can terminate until the transmitter receives another ACK/NAK packet.

Figure 8:
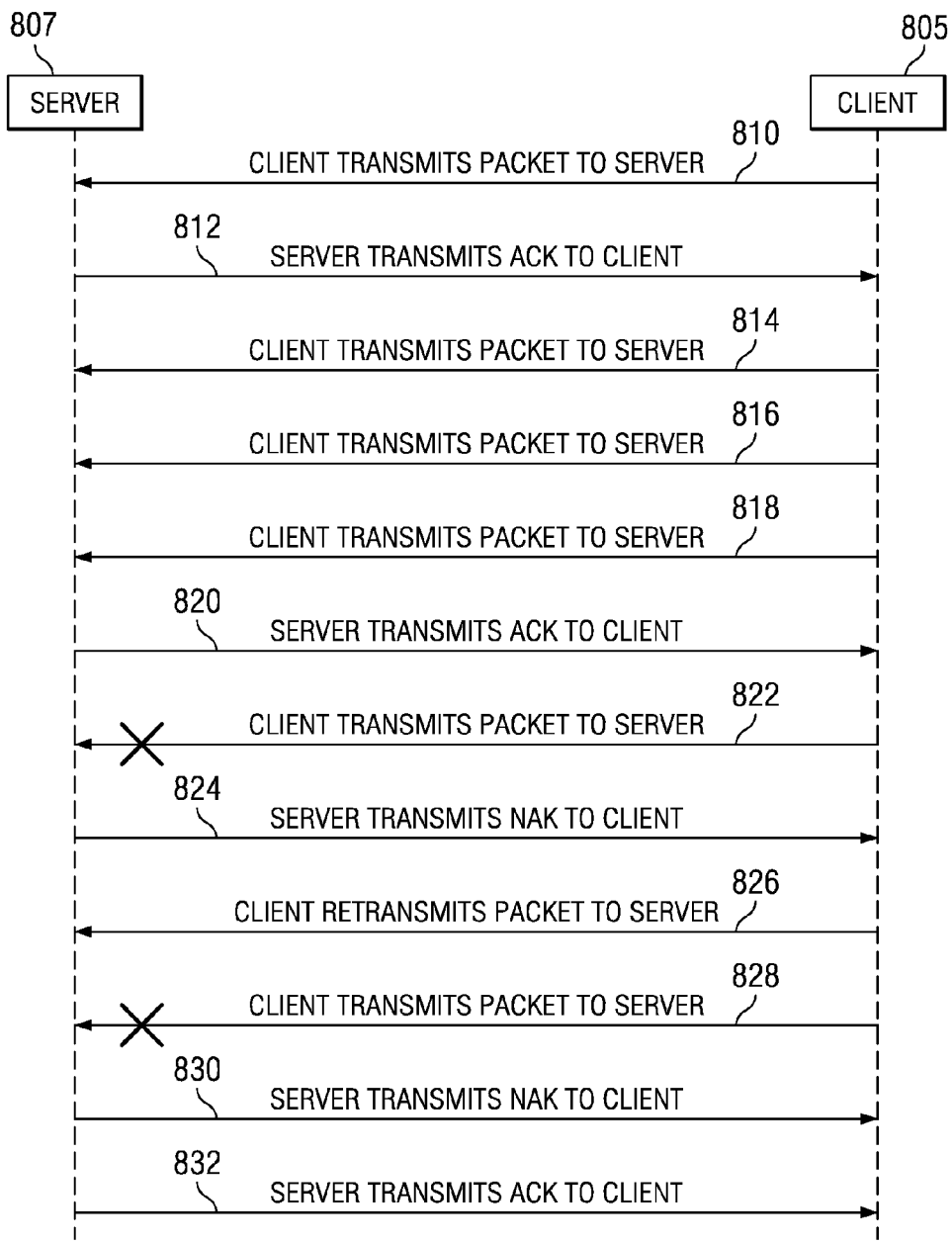
FIG. 8 is a diagram of an exemplary series of transmissions between a client device and a server device, according to a preferred embodiment of the present invention.

With reference now to FIG. 8, there is shown a diagram illustrating an exemplary series of packet transmissions between a client device 805 and a server device 807, according to a preferred embodiment of the present invention. An initial transmission (shown as oval 810) of a packet from the client device 805 to the server device 807 arrives successfully at the server device 807. As a result, the server device 807 transmits (shown as oval 812) an ACK packet back to the client device 805. The client device 805 then transmits three packets (shown as ovals 814, 816, and 818) to the server device 807. A possible reason for the client device 805 transmitting packets prior to receipt of an ACK packet may be perhaps that the client device 805 transmits the second and the third packets before the first packet arrives at the server device 807.

With three consecutive packets arriving from the client device 805, the server device 807 can either transmit three ACK packets, one for each of the arriving packets, or the server device 807 can transmit a single ACK packet (shown as oval 820) that has a sequence number that is the same as that of the last of the three consecutive packets. The use of the single ACK packet in place of the three ACK packets can help to reduce the control packet traffic and therefore reduce overhead in the network.

In a next transmission (shown as oval 822) the client device 805 transmits a packet to the server device 807. However, the packet arrives at the server device 807 with an error. As a result, the server device 807 transmits a NAK packet back to the client device 805 (shown as oval 824). When the client device 805 receives and decodes the NAK packet from the server device 807, the client device 805 retransmits the packet to the server device 807 (shown as oval 826). Before the client device 805 receives either an ACK or a NAK packet for the packet that it retransmitted, the client device 805 transmits another packet to the server device 807 (shown as oval 828). Once again, the packet arrives at the server device 807 with an error, so the server device 807 returns a NAK packet to the client device 805 (shown as oval 830). After sending the NAK packet, the server device 807 receives an earlier packet retransmitted by the client device 805 (shown as oval 826) and returns an ACK packet to the client device 805 (shown as oval 832).

According to a preferred embodiment of the present invention, each packet transmitted in the network, be it a control packet or a packet containing data or information, contains a header. The header contains information such as a source of the packet, a destination of the packet, error check information, the packet's sequence number, routing performance information, and so forth.

Figure 9:
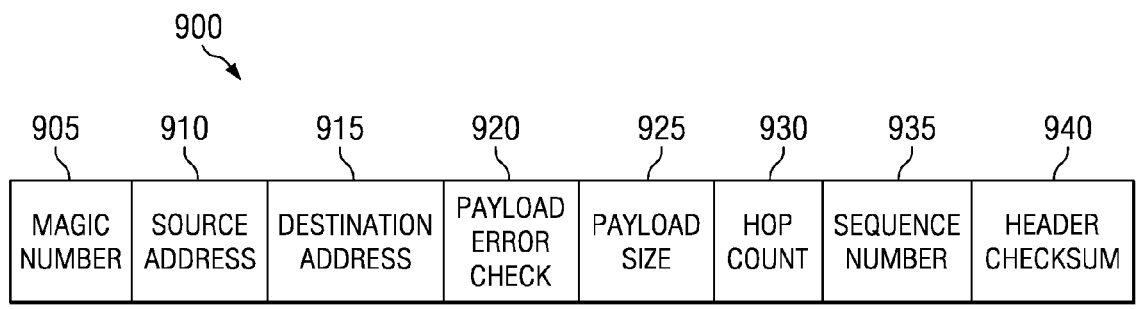
FIG. 9 is a diagram of a header for a transmission packet, according to a preferred embodiment of the present invention.

With reference now to FIG. 9, there is shown a diagram illustrating an exemplary packet 900, according to a preferred embodiment of the present invention. The header 900 comprises a plurality of fields, each serving a specific purpose in helping a packet containing the header 900 arrive at its intended destination. A first field 905, referred to as a magic number field, can be used to contain an indicator to differentiate different types of packet traffic on the network. For example, if the first field 905 contains a specified value, then the packet containing the header 900 is of a certain type of traffic. The first field 905 can be used to help readily distinguish between packets of different types and simplify the detection. Preferably, the first field 905 is two bytes in size. A second field 910, referred to as a source address field, can be used to contain a protocol address of a source device of the packet. According to a preferred embodiment of the present invention, the second field 910 can also contain a port address corresponding to a source port of the packet. Preferably, the second field 910 is four bytes in size. A third field 915, referred to as a destination address field, can be used to contain a protocol address of a destination device of the packet. Again, the third field 915 can also contain a port address corresponding to a destination port of the packet. Preferably, the third field 915 is four bytes in size. A fourth field 920, referred to as a payload error check field, can contain an error check code (preferably a cyclic redundancy code error check) for data being carried in the packet. Note that if the packet is not containing data, then the fourth field 920 can be left blank. Preferably, the fourth field 920 is two bytes in size. A fifth field 925, referred to as a payload size field, can be used to indicate a size of the data payload being carried by the packet. Preferably, the fifth field 925 is one byte in size. A sixth field 930, referred to as a hop count field, can be used to indicate a maximum number of hops the packet may traverse, wherein a hop can be defined as the traversal of a single network link. Preferably, the sixth field 930 is one byte in size.

A seventh field 935, referred to as a sequence number field, can contain a value corresponding to a sequencing number of the packet. The sequencing number can be used to ensure in-order delivery of packets. Preferably, the seventh field 935 is one byte in size and values zero (0) and 255 are reserved for system use. An eighth field 940, referred to as a header checksum field, can be used to contain an error check code (preferably a simply byte-wise sum) for the header 900. Preferably, the eighth field 940 is one byte in size.

In addition to the aspects of the preferred embodiment of the present invention discussed above, which are directly viewable in packets and headers used in the network, there are aspects of a communications protocol that may not be directly visible in the packets. These aspects can affect performance, memory consumption, bandwidth requirements, and so forth. These aspects can be tunable values that can be made by each device in the network and can be based upon considerations such as available memory, processing power, perceived quality of the network connection, and so on.

The tunable values that can be set to specify these aspects can include: a retry timer, a retry limit, a packet window size, a byte window size, and a default hop count. The retry timer can specify an amount of time that a device is required to wait before it can declare that a packet is lost and that it should retransmit the packet. The retry limit can specify an amount of times that a retransmission can be attempted before a packet is deemed undeliverable. The packet window size can specify a maximum number of unacknowledged packets before further transmissions are stopped. The byte window size can specify a maximum number of bytes of data that can remain unacknowledged before further transmissions are stopped. The default hop count can specify a maximum number of routing hops that a packet can undergo, to prevent infinite routing loops.

According to a preferred embodiment of the present invention, a preferred network is a point-to-point network with a host device and a plurality of client devices coupled to the host device. Note however, that the present invention can be applicable to other types of networks, such as shared medium networks, broadcast networks, and so forth. An exemplary use of the preferred network can be in a classroom (or teaching) situation, wherein an instructor using a host device can interact with students, wherein each student is using a client device. The instructor can perform tasks such as provide lessons or homework, ask questions, prompt for answers, give examinations, and so forth. The students, on the other hand, can perform tasks such as answer questions, provide demonstrations, request assistance, and so on. The host device may be a personal computer or an electronic calculator, while the client devices can range from electronic calculators of varying capability to personal computers.

With reference now to FIGS. 10a through 10c, there are shown diagrams illustrating interchanges of packets between devices on a network for several different scenarios, according to a preferred embodiment of the present invention. The different scenarios shown in FIGS. 10a through 10c can be representative of the types of packet interchanges that can be performed in an instructional environment and are used to demonstrate the capabilities of a preferred embodiment of the present invention. The FIGS. 10a through 10c illustrate packet exchanges between applications and services executing on client devices and host devices and potential computations on the client and host devices over time.

With reference to FIG. 10a, a scenario is shown wherein students can create and share objects (for example, mathematical functions) on their client devices in a collaborative fashion so that the student can virtually cooperate in the construction of a common object. A common object with several parameters can be shared among a group of students. Each student has a potential to take ownership of one or more parameters, either voluntarily or by assignment.

The scenario can be implemented as follows: a student (represented herein as a client application 1001) can request from a host (represented herein as host services 1002) a representation of the common object (shown as oval 1005), to which the host services 1002 responds with a delivery of the common object (shown as oval 1007). A dashed vertical line, such as line 1003, can represent operations occurring at a device (on an application or service executing on the device), such as the client application 1001 executing on a client device, while a large solid vertical line, such as line 1004, can represent computations occurring at a device, such as the host services 1002 performing some computations to determine if the client application 1001 should be provided a representation of the common object. Upon receipt of the common object, the client application 1001 can make a request for ownership of one or more parameters of the common object (shown as oval 1009). The host services 1002 may accept or deny the request for ownership from the client application 1001 (shown as oval 1011) due to reasons such as the parameter having already been requested, the client application 1001 has requested too many parameters, and so forth.

After being granted ownership of one or more parameters, the client application 1001 can make modifications to the parameter(s) (shown as oval 1013) and once the modifications are complete, the client application 1001 can send the modified parameters back to the host services 1002 (shown as oval 1015). Whenever the host services 1002 receives a modified parameter(s), the host services 1002 can make changes to the common object (shown as oval 1017). Alternatively, the host services 1002 can wait until it receives all of the assigned parameters back from the different client applications before it makes changes to the common object. With the common object changed, the host services 1002 can update each client application with the changed common object (shown as oval 1019).

With reference to FIG. 10*b*, a scenario is shown wherein an instructor can pose a question (a challenge) to students on their client devices and then the students can submit their responses to the instructor. An example of such a scenario can be the instructor providing a quiz question to the students and the students can submit their answers to the quiz question to the instructor for evaluation. The scenario can be implemented as follows: the instructor (represented herein as a host application 1031) can provide a question (a challenge) to the students (represented herein as a client application 1032). The question can be provided to the students in the form of a packet(s) transmitted to the client application 1032 (shown as oval 1035). After receiving the question from the instructor, each of the students can formulate a response to the question and when complete, each student can transmit a response back to the instructor (shown as oval 1037).

With reference to FIG. 10*c*, a scenario is shown wherein students can submit information to their instructor, who could combine the information provided by the students and provide an aggregation of the information to the students. The scenario can be implemented as follows: a student (represented herein as a client application 1051) can submit data to the instructor (shown herein as a host application 1052). The transmission of the data to the host application 1052 is shown as oval 1055. Multiple client applications may be transmitting data to the host application 1052. Upon receipt of the data, the host application 1052 can combine (aggregate) the data together (shown as oval 1057) and after combining, the host application 1052 can transmit results of the combination to the client application(s) (shown as oval 1059).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of communicating a sequence of transmission packets, the method comprising:
    communicating the transmission packets from a source device to a destination device through multiple connections that are virtual links, wherein each of the multiple connections is for communication between only a respective pair of applications executing on the source device and the destination device respectively, wherein each particular one of the transmission packets comprises a respective header and a respective data payload, and wherein the respective header includes:
        an identifier field comprising data to distinguish traffic type;
        a source address field comprising an address of the source device and a source port of a particular one of the multiple connections through which the particular transmission packet is communicated, wherein the source port is assigned to the particular connection from among multiple ports of the source device;
        a destination address field comprising an address of the destination device and a destination port of the particular connection, wherein the destination port is assigned to the particular connection from among multiple ports of the destination device, and wherein the source port and the destination port together make the particular connection unique from another one of the multiple connections;
        a payload error check code field comprising an error check for the respective data payload;
        a payload size field comprising a size indicator of the respective data payload;
        a hop count field comprising a count of a maximum number of routes the particular transmission packet can traverse;
        a sequencing field comprising a respective value for ordering the particular transmission packet, wherein the respective value is always a sequence number of the particular transmission packet within the sequence of all transmission packets communicated from the source device to the destination device through the multiple connections; and
        a header error check code field comprising an error check for the respective header.

2. The method of claim 1, wherein the respective header is a sixteen byte binary stream.

3. The method of claim 2, wherein the identifier field comprises a two byte binary stream, wherein the source address field comprises a four byte binary stream, wherein the destination address field comprises a four byte binary stream, wherein the payload error check code field comprises a two byte binary stream, wherein the payload size field comprises a one byte binary stream, wherein the hop count field comprises a one byte binary stream, wherein the sequencing field comprises a one byte binary stream, and wherein the header error check code field comprises a one byte binary stream.

4. The method of claim 1, wherein the error check in the payload error check code field comprises a cyclic redundancy code error check.

5. The method of claim 1, wherein the respective value ranges from 1 to 254.

6. The method of claim 1, wherein the respective data payload follows the respective header in the particular one of the transmission packets.

7. A system for communicating a sequence of transmission packets, the system comprising:
  a source device for communicating the transmission packets to a destination device through multiple connections that are virtual links, wherein each of the multiple connections is for communication between only a respective pair of applications executing on the source device and the destination device respectively, wherein each particular one of the transmission packets comprises a respective header and a respective data payload, and wherein the respective header includes:
    an identifier field comprising data to distinguish traffic type;
    a source address field comprising an address of the source device and a source port of a particular one of the multiple connections through which the particular transmission packet is communicated, wherein the source port is assigned to the particular connection from among multiple ports of the source device;
    a destination address field comprising an address of the destination device and a destination port of the particular connection, wherein the destination port is assigned to the particular connection from among multiple ports of the destination device, and wherein the source port and the destination port together make the particular connection unique from another one of the multiple connections;
    a payload error check code field comprising an error check for the respective data payload;
    a payload size field comprising a size indicator of the respective data payload;
    a hop count field comprising a count of a maximum number of routes the particular transmission packet can traverse;
    a sequencing field comprising a respective value for ordering the particular transmission packet, wherein the respective value is always a sequence number of the particular transmission packet within the sequence of all transmission packets communicated from the source device to the destination device through the multiple connections; and
    a header error check code field comprising an error check for the respective header.

8. The system of claim 7, wherein the respective header is a sixteen byte binary stream.

9. The system of claim 8, wherein the identifier field comprises a two byte binary stream, wherein the source address field comprises a four byte binary stream, wherein the destination address field comprises a four byte binary stream, wherein the payload error check code field comprises a two byte binary stream, wherein the payload size field comprises a one byte binary stream, wherein the hop count field comprises a one byte binary stream, wherein the sequencing field comprises a one byte binary stream, and wherein the header error check code field comprises a one byte binary stream.

10. The system of claim 7, wherein the error check in the payload error check code field comprises a cyclic redundancy code error check.

11. The system of claim 7, wherein the respective value ranges from 1 to 254.

12. The system of claim 7, wherein the respective data payload follows the respective header in the particular one of the transmission packets.

* * * * *